United States Patent
Eoo

(10) Patent No.: US 11,928,532 B1
(45) Date of Patent: Mar. 12, 2024

(54) GATEWAY DEVICE FOR INTEGRALLY PROCESSING APIs WITH SECURITY FUNCTION, AND METHOD OF OPERATING SAME

(71) Applicant: Ideatec Co., Ltd., Seoul (KR)

(72) Inventor: Yun Ho Eoo, Seoul (KR)

(73) Assignee: Ideatec Co., Ltd., Seoul (KR)

( * ) Notice: Subject to any disclaimer, the term of this patent is extended or adjusted under 35 U.S.C. 154(b) by 0 days.

(21) Appl. No.: 18/377,525

(22) Filed: Oct. 6, 2023

(30) Foreign Application Priority Data

Oct. 7, 2022 (KR) ........................ 10-2022-0128921

(51) Int. Cl.
*G06F 9/46* (2006.01)
*G06F 9/54* (2006.01)

(52) U.S. Cl.
CPC ................................... *G06F 9/547* (2013.01)

(58) Field of Classification Search
CPC ....................................................... G06F 9/547
See application file for complete search history.

(56) References Cited

U.S. PATENT DOCUMENTS 10,983,850 B1 * 4/2021 Kwan .................. G06F 11/0793
2020/0387415 A1 * 12/2020 Take ....................... G06Q 50/10

FOREIGN PATENT DOCUMENTS

| CN | 111367690 A | * | 7/2020 | ............. G06F 9/547 |
| KR | 10-2018-0077020 A | | 7/2018 | |
| KR | 10-2018-0078296 A | | 7/2018 | |
| KR | 10-2262093 A | | 6/2021 | |

* cited by examiner

*Primary Examiner* — Diem K Cao
(74) *Attorney, Agent, or Firm* — Heedong Chae; Lucem, PC

(57) ABSTRACT

The present disclosure relates to a gateway device supporting integral processing of APIs with security function, and a method of operating the gateway device. In more detail, the present disclosure relates to a gateway device for integrally processing APIs with a security function, the gateway device supporting a security function that notifies of a security danger when a problem is generated by analyzing logs in the process of API calling and responding and supporting a security function that increases security for a new environment in which calling of several API servers and responding are repeated in a gateway by applying a function of integrally processing a plurality of API functions by registering the API functions into a unit API service to the gateway, and a method of operating the gateway device.

8 Claims, 10 Drawing Sheets

GATEWAY DEVICE FOR INTEGRALLY PROCESSING APIs WITH SECURITY FUNCTION, AND METHOD OF OPERATING SAME

CROSS REFERENCE TO RELATED APPLICATION

The present application claims priority to Korean Patent Applications No. 10-2022-0128921, filed Oct. 7, 2022 the entire contents of which are incorporated herein for all purposes by this reference.

BACKGROUND

Technical Field

The present disclosure relates to a gateway device supporting integral processing of APIs with security function, and a method of operating the gateway device. In more detail, the present disclosure relates to a gateway device for integrally processing APIs with a security function, the gateway device supporting a security function that notifies of a security danger when a problem is generated by analyzing logs in the process of API calling and responding and supporting a security function that increases security for a new environment in which calling of several API servers and responding are repeated in a gateway by applying a function of integrally processing a plurality of API functions by registering the API functions into a unit API service to the gateway, and a method of operating the gateway device.

Description of the Related Art

The monolithic service system of the related art uses the configuration in which a client directly calls an API server and a service execution result of a service requested by the client is received from the API server and provided. However, in this service system, a server has to be stopped to change or update an API, so there is a problem that service disconnection occurs for the server stop period, and when there are many clients using the API of a single server, there is a problem that the single server fails to cope with load and the service quality is deteriorated.

A MicroServices Architecture (MSA)-based service system that has a plurality of API servers corresponding to a plurality of different APIs, respectively, and divisionally processes a plurality of APIs, which is used in a service, through a plurality of API servers has been appearing recently in order to improve such a monolithic service environment.

Such an MSA-based service system includes a gateway device that relays communication with clients and API servers and the gateway device improves the service quality by distributing traffic load accompanying a service request, which is received from many clients, to a plurality of API servers.

However, such an MSA-based service system performs a process of requesting a response from a gateway device by means of a client for each of a plurality of APIs constituting a service, transmits the request to an API server, receives a response from the API server, and transmits the response back to the client, so many traffics are generated for a single API, whereby the service processing process is complicated. Further, since traffics that are generated for one API are considerable, traffic load is generated, so there is a problem that the service quality is deteriorated.

Further, since the importance of a gateway existing between many APIs and a client is high in such an MSA-based service system, a security danger about the gateway increases, so rule-based security management based on the location of a connected user, the address of the connected user, login information, a management class, the content of a request message, the content of a response message, etc., which are known, is necessarily required, and it is also required to analyze the communication log of a connector However, in communication log analysis, the MSA-based service system has a plurality of API servers having the same function and performs a function of distributing load in a gateway, so there is a problem that even though there is a request from the same API, it is difficult to determine whether there is a problem using a quantified rule because the pattern of a communication log including unit delay for the request and a response message is not uniform.

SUMMARY

An objective of the present disclosure is to be able to make a gateway device, which manages API call and response between a client device that provides a service using a plurality of APIs provided by a plurality of API servers and the plurality of API servers, create log information about API server call and response, create connection pattern information on the basis of a plurality of items of log information for API call and response for a corresponding API service, learn correlation between connection pattern information for the API service and whether the connection pattern information is normal through an AI learning model, and then determine whether there is a problem by applying new connection pattern information for a specific API service to the AI learning model, thereby increasing security performance of a gateway.

In particular, the API service of the present disclosure can be used after a configuration of calling a plurality of APIs and using response information is registered in a gateway as one work scenario in a user-defined type. In this case, a plurality of APIs is called and responses are generated in the gateway, so it is difficult to determine whether there is a problem through quantitative analysis on accumulation of irregular connection logs. Accordingly, an objective of the present disclosure is to provide a gateway device that provides support such that a client device can set and register a work scenario, which sets an execution type for a plurality of APIs included in an API-based front-end service, as an API service to provide the front-end service and that operates to create and provide a service execution result to the client device by communicating with a plurality of API servers in accordance with a pre-registered work scenario corresponding to a requested API service as long as the client device designates a request object API service, thereby providing support such that a service execution result requested by the client device is provided with minimum traffic. Further, an objective is to increase security for information received from the gateway device by making it possible to determine whether there is a problem even in an irregular connection state using a deep learning-type AI learning model on the basis of log created in the process of API call and response for a plurality of API servers.

According to an embodiment of the present disclosure, a gateway device for integrally processing APIs with a security function that integrally manages API calls and response information between a client device and a plurality of API servers, includes: a setting unit configured to provide a work interface for setting a work scenario for an API service so that API-related work of a service, which is configured to use a plurality of API calls and response information, is set and used as a user-defined API service, and receive setting information about performing combination of a plurality of APIs constituting the API service from the client device through the work interface; a registering unit configured to register the setting information as work scenario information for the API service; an integrally-performing unit configured to, when receiving request information for a pre-registered API service from the client device, in linkage with the registering unit, extract the work scenario information corresponding to the request information, perform combination and execution of a plurality of APIs included in the work scenario information in parallel or in series in accordance with an API execution type set in advance in the work scenario information, create a service execution result, based on response information received from each of a plurality of API servers respectively corresponding to the plurality of APIs in accordance with the performance, and transmit the service execution result to the client device; and a security-performing unit configured to, in linkage with the integrally-performing unit, create log information about API server call and response for each of a plurality of APIs according to the work scenario information and then create connection pattern information based on a plurality of items of log information corresponding to the work scenario information, and apply the created connection pattern information and the work scenario information to a preset learning model that has learned correlation between work scenario information, connection pattern information, and whether the connection pattern information is normal, thereby determining whether there is a problem.

As an example related to the present disclosure, the security-processing unit may determine that there is a problem when an estimated result of abnormality obtained by applying the created connection pattern information and the work scenario information to the learning model is a preset reference value or more, may create and transmit notification information to a preset terminal when there is a problem.

As an example related to the present disclosure, the registering unit may match and store the work scenario information received from the client device with pre-stored user information corresponding to the client device when registering the work scenario information; the gateway device may further include a managing unit configured to check a connection right of the client device, when receiving request information from the client device, by comparing user authentication information according to the request information and user authentication information included in the pre-stored user information corresponding to the client device with each other in accordance with at least one of a connection location of the client device, a user right according to user authentication information, and a connection path pattern, based on preset rule information; and the integrally-performing unit may create the service execution result when the client device is authenticated in linkage with the managing unit.

As an example related to the present disclosure, the security-processing unit may determine whether there is an error based on the log information every time the security-processing unit creates the log information, and, when an error is generated, the security-processing unit may create error generation information including the log information having an error and transmit the error generation information to a specific API server corresponding to an API having the error.

As an example related to the present disclosure, the gateway device may further include a format conversion unit configured to store response format information for a format of the response information of each of the plurality of API servers, and convert the format of the response information into request information of the client device based on response format information of an API server corresponding to the response information and the request format of the client device according to the work scenario information when receiving the response information in linkage with the integrally-performing unit, wherein the integrally-performing unit creates the service execution result using a plurality of items of response information converted into the request format.

As an example related to the present disclosure, the integrally-performing unit recognizes APIs that are executed in parallel in accordance with the API execution type set in the work scenario information for each of a plurality of APIs included in the work scenario information as parallel execution APIs, recognizes APIs that are executed in series as serial execution APIs, recognizes an execution order of each of the plurality of APIs, requests and receives, when determining a plurality of parallel execution APIs having the same execution order, response information according to execution of the parallel execution APIs from API servers corresponding to the parallel execution APIs for the plurality of respective parallel execution APIs and then create a response result that is response information merging a plurality of items of response information corresponding to the plurality of parallel execution APIs, respectively, receives, when determining the serial execution APIs, response information requested in accordance with execution of the serial execution APIs from API servers corresponding to the serial execution APIs, and applies response information corresponding to an earlier API as an input value to a later API corresponding to a next of the earlier API in accordance with the execution order of each of the plurality of APIs according to the API execution type, thereby creating a service execution result based on final response information obtained by executing the plurality of APIs.

As an example related to the present disclosure, when the API execution type is a first combination type in which parallel execution and serial execution are sequentially combined, the integrally-performing unit may: apply search information included in the request information to a first API and a second API that are serial execution objects having the same execution order in the plurality of APIs, and requests and receives first response information corresponding to the first API, to which the search information has been applied, through communication with a first API server corresponding to the first API; request and receive second response information corresponding to the second API, to which the search information has been applied, through communication with a second API server corresponding to the second API; and then create a first response result by merging the first response information and the second response information; and apply the first response result, as an input value, to a third API that is a serial execution API determined in accordance with the first combination type, and request and receive third response information corresponding to the third API, to which the first response result has been applied, through communication with a third API server corresponding to the third API; and then create a service execution result based on the third response information.

As an example related to the present disclosure, when the API execution type is a second combination type in which serial execution and parallel execution are sequentially combined, the integrally-performing unit may: apply search information according to the request information to a fourth API that is a serial execution API of the plurality of APIs, and request and receive fourth response information corresponding to a fourth API, to which the search information has been applied, through communication with a fourth API server corresponding to the fourth API; apply the fourth response information to a fifth API and a sixth API that are serial execution objects determined in accordance with the second combination type of the plurality of APIs, request and receive fifth response information corresponding to a fifth API, to which the fourth response information has been applied, through communication with a fifth API server corresponding to the fifth API, and request and receive sixth response information corresponding to a sixth API, to which the fourth response information has been applied, through communication with a sixth API server corresponding to the sixth API; and then create a second response result by merging the fifth response information and the sixth response information and creates a service execution result based on the second response result.

As an example related to the present disclosure, when the API execution type is a second combination type in which serial execution and parallel execution are sequentially combined, the integrally-performing unit may: apply search information included in the request information to a seventh API and an eighth API that are parallel execution objects in the plurality of APIs, request and receive seventh response information corresponding to a seventh API, to which the search information has been applied, through communication with a seventh API server corresponding to the seventh API, and request and receive eighth response information corresponding to an eighth API, to which the search information has been applied, through communication with an eighth API server corresponding to the eighth API; and then create a third response result by merging the seventh response information and the eighth response information; and apply the third response result to a ninth API and a tenth API that are serial execution objects of the plurality of APIs, request and receive ninth response information corresponding to a ninth API, to which the third response result has been applied, through communication with a ninth API server corresponding to the ninth API, and request and receive tenth response information corresponding to a tenth API, to which the third response result has been applied, through communication with a tenth API server corresponding to the tenth API; and then create a fourth response result by merging the ninth response result and the tenth response result and creates a service execution result based on the fourth response result.

According to an embodiment of the present disclosure, a method of operating a gateway device for integrally processing APIs with a security function that integrally manages API calls and response information between a client device and a plurality of API servers, may include: providing a work interface for setting a work scenario for an API service so that API-related work of a service, which is configured to use a plurality of API calls and response information, is set and used as a user-defined API service, and receiving setting information about performing combination of a plurality of APIs constituting the API service from the client device through the work interface; registering the setting information as work scenario information for the API service; extracting, when receiving request information for a pre-registered API service from the client device, the work scenario information corresponding to the request information, performing combination and execution of a plurality of APIs included in the work scenario information in parallel or in series in accordance with an API execution type set in advance in the work scenario information, creating a service execution result, based on response information received from each of a plurality of API servers respectively corresponding to the plurality of APIs in accordance with the performance, and transmitting the service execution result to the client device; and creating log information about API server call and response for each of a plurality of APIs according to the work scenario information and then creating connection pattern information based on a plurality of items of log information corresponding to the work scenario information, and applying the created connection pattern information and the work scenario information to a preset learning model that has learned correlation between work scenario information, connection pattern information, and whether the connection pattern information is normal, thereby determining whether there is a problem.

The present disclosure provides a client device that provides a service using a plurality of APIs provided by a plurality of API servers and a gateway device that manages API call and response between the plurality of API servers; and gives support such that the user of the client device can create a work scenario by designating a plurality of APIs required for an API service and an execution type for the plurality of APIs in the gateway device and such that even though the client device requests a service execution result of the API service only one time, the gateway device can receive response information from the plurality of API servers while calling the plurality of APIs in accordance with the work scenario set by the user and then can provide a service execution result to the client device on the basis of the response information. Accordingly, it is possible to minimize traffic load that is generated between a client device and a gateway device in the related art and it is possible to increase service development efficiency for processing an API service. Further, a connection pattern is created on the basis of logs recorded every time an API service is executed in accordance with a work scenario and learned by a learning model together with the work scenario and the result of determining whether it is normal. Thereafter, when the learning model finishes learning, whether a current connection pattern for a specific API service that is currently executed and the specific API service are normal is determined through the learning model, and when it is determined that they are abnormal, it is determined that abnormal access such as hacking was generated to the gateway device, and security threatening is notified, whereby it is possible to increase security for information that is processed in the gateway device.

Further, the present disclosure increases convenience for updating an API-based service of a client device according to a change of an API server and improves an API service speed of a client device, thereby being able to greatly improve development and use efficiency of a service using APIs.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Hereinafter, detailed embodiments of the present disclosure are described with reference to the drawings.

Figure 1:
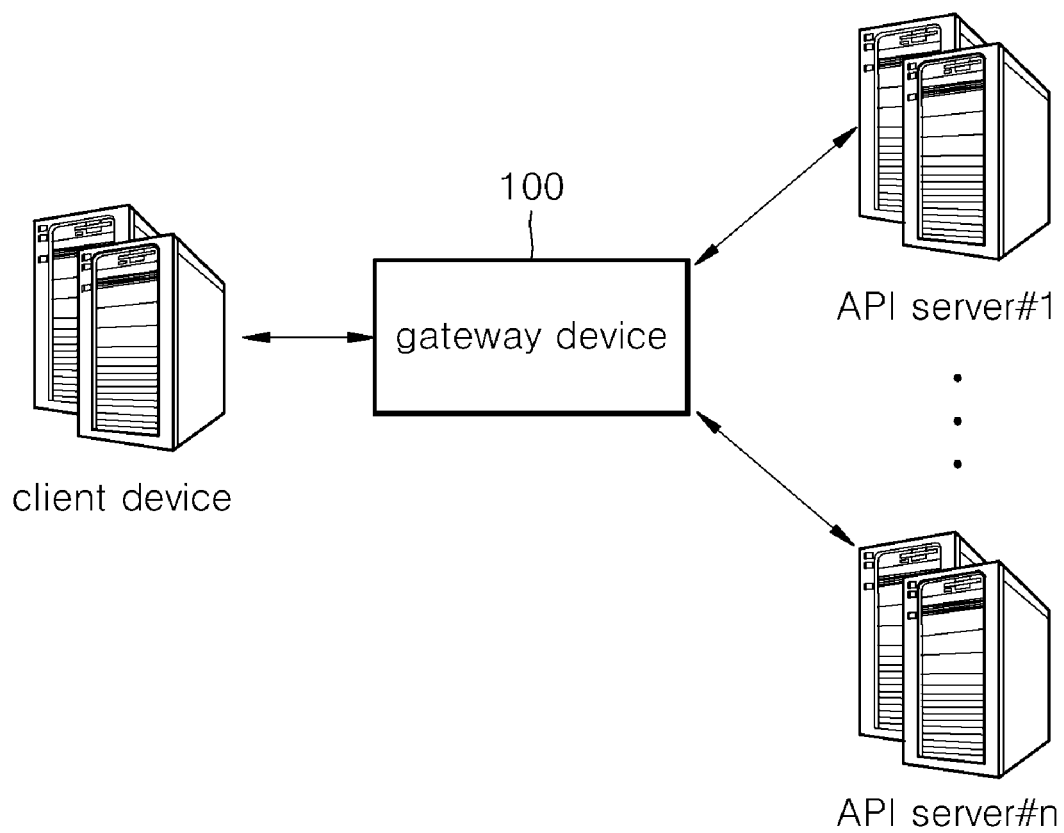
FIG. 1 is a configuration environment diagram related to a gateway device for integrally processing APIs with a security function according to an embodiment of the present disclosure.

FIG. 1 is a configuration environment diagram related to a gateway device for integrally processing APIs with a security function (hereafter, gateway device) according to an embodiment of the present disclosure.

As shown in the figure, a gateway device 100 according to an embodiment of the present disclosure can communicate with one or more client devices and a plurality of API servers through a communication network.

In this configuration, the communication network described in the present disclosure may include wired/wireless communication networks, and the wireless communication network may include Wireless LAN (WLAN), Digital Living Network Alliance (DLNA), Wireless Broadband (Wibro), World Interoperability for Microwave Access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), a 5G mobile communication service, Bluetooth, Long Range (LoRa), Radio Frequency Identification (RFID), Infrared Data Association (IrDA), Ultra Wideband (UWB), ZigBee, Near Field Communication (NFC), Ultra Sound Communication (USC), Visible Light Communication (VLC), Wi-Fi, Wi-Fi Direct, etc. Further, the wired communication network may include a Local Area Network (LAN), a wired Wide Area Network (WAN), Power Line Communication (PLC), USB communication, Ethernet, serial communication, an optical/coaxial cable, etc.

Further, the client device may be configured as a front-end-based service device that provides a web service, a web-based service, etc. to a service user terminal, and the service device may be configured as a server.

In this configuration, the client device can provide a specific service (or a front-end service) including one or more API services, and the API service is a service included in a front-end service configuration configured in a client level to provide a specific service using a plurality of APIs and may be included in a webpage, a terminal display interface, etc. providing information collected using a plurality of APIs.

Further, a plurality of API servers each can provide an Application Programming Interface (API) for implementing a service provided by the client device, and a plurality of API servers corresponding to one API may be configured to communicate with the gateway device 100.

In the related art, when a client device directly connects to an API server by executing an API service composed of a plurality of APIs through coding, there is a problem that the service is also stopped when the operation of the API server is stopped or it is difficult to distribute load on the API server, so a gateway device for solving this problem is introduced. However, the gateway device of the related art transmits a response for each API to a client device every time the client device calls a plurality of APIs constituting a single API service, whereby there is a problem that considerable traffic load is generated in a single API service due to transmission of a response for each of a plurality of APIs to the client device.

In order to solve this problem, the gateway device 100 according to an embodiment of the present disclosure provides support such that a user of a client device can register, in a nocoding type, a work scenario which combines responses of APIs which can be processed in parallel of a plurality of APIs constituting an API service or which makes APIs, which need to be processed in series, be sequentially processed and provides support such that one response can be provided to the client device by integrally processing a plurality of responses that is received from a plurality of APIs servers respectively corresponding to a plurality of APIs, which are objects of a call, for the plurality of APIs constituting the API service even though there is only an API service call from the client device on the basis of the work scenario, thereby being able to provide support such that traffic load can be minimized and security for information received by the gateway device 100 can be increased by notifying of a security danger when a problem is generated by analyzing logs created in the process of API calling and responding for a plurality of API servers according to a work scenario, which is described hereafter in detail with reference to drawings.

Figure 2:
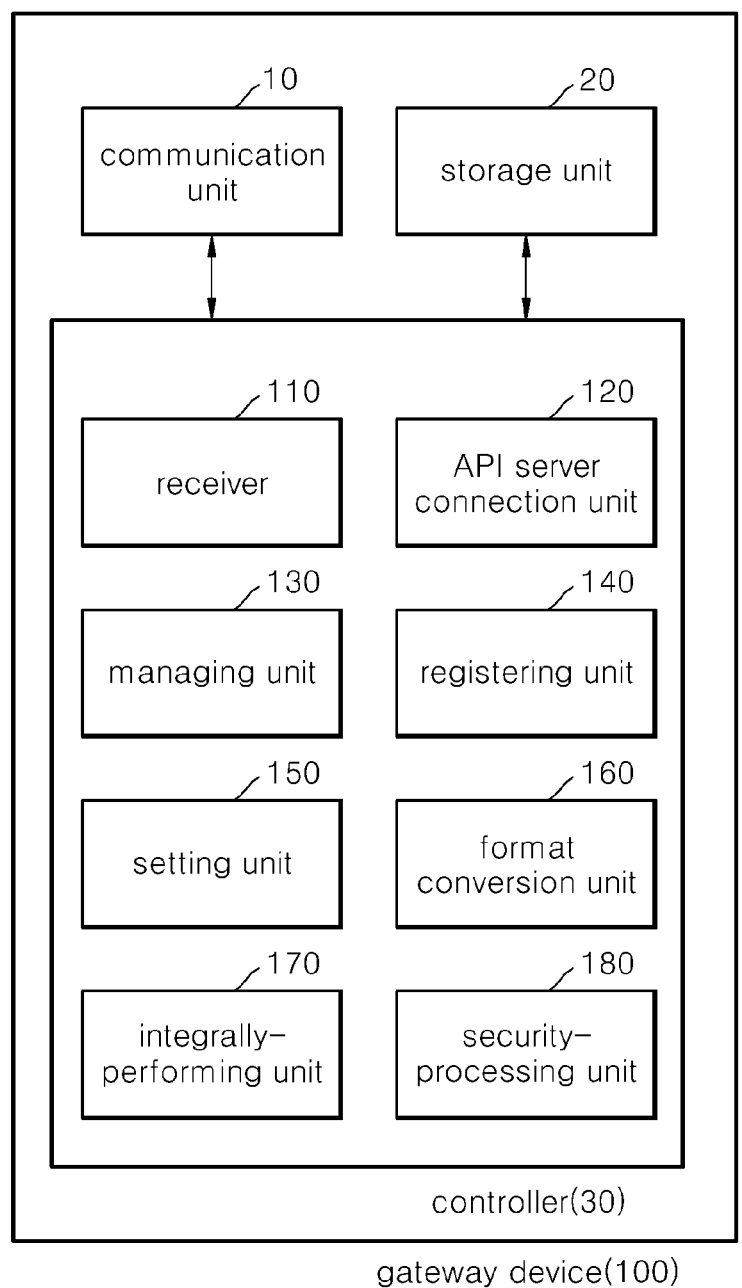
FIG. 2 is a detailed configuration diagram of the gateway device for integrally processing APIs with a security function according to an embodiment of the present disclosure.
Figure 3:
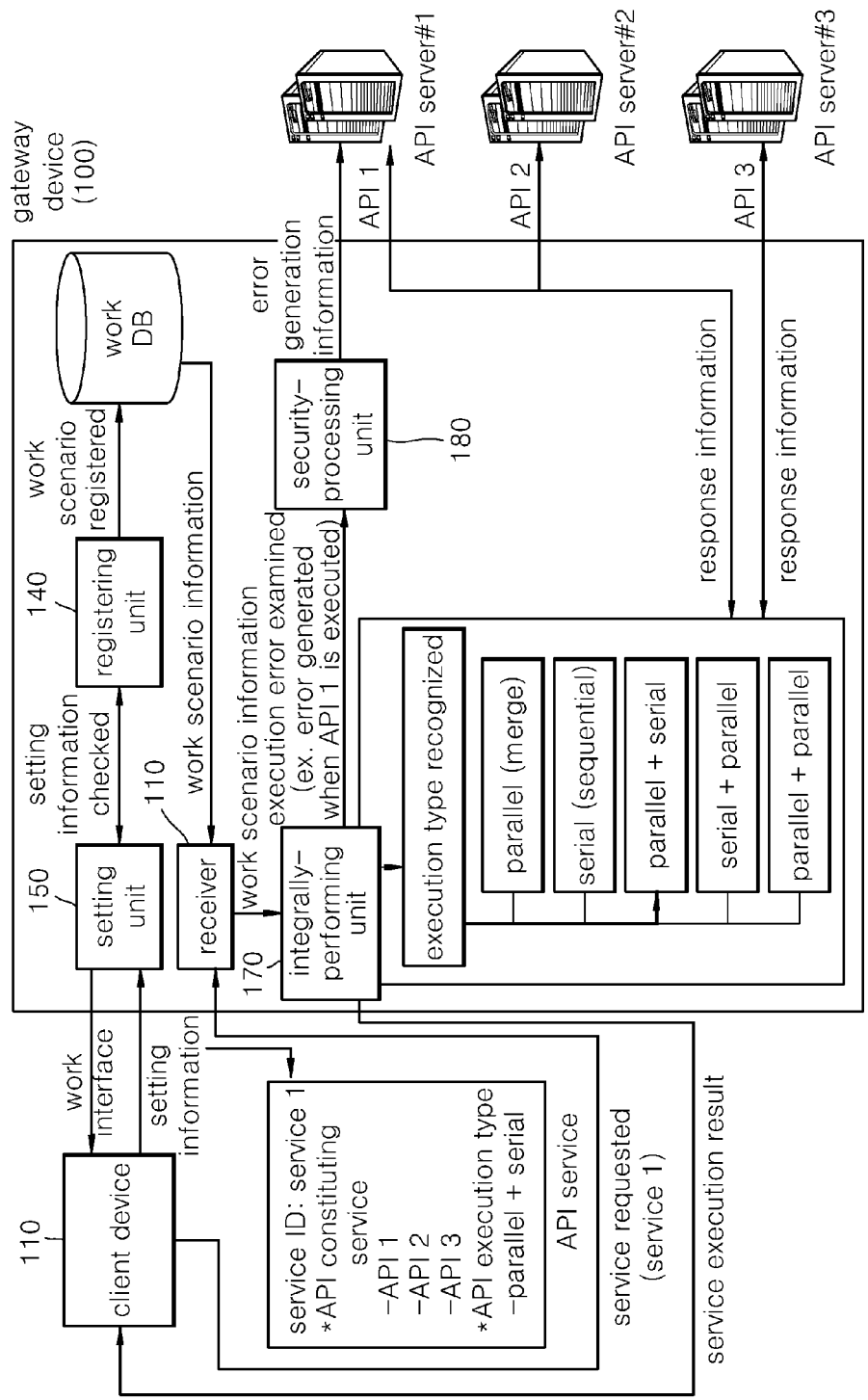
FIGS. 3 to 9 are exemplary operation diagrams of the gateway device for integrally processing APIs with a security function according to an embodiment of the present disclosure.

First, FIG. 2 is a detailed configuration diagram of the gateway device 100 according to an embodiment of the present disclosure and FIG. 3 is an exemplary operation diagram of the gateway device 100 according to an embodiment of the present disclosure.

As shown in the figures, the gateway device 100 may include a communication unit 10, a storage unit 20, and a controller 30.

First, the communication unit 10 can communicate with one or more client devices and a plurality of API servers through a communication network.

Further, the storage unit 20 may be configured to store various items of information required for operation of the gateway device 100 and may be configured to store one or more DBs, and the DB may be configured as a separate database server.

Further, the controller 30 may be included in the gateway device 100 to perform a general control function on the gateway device 100 and may include a RAM, a ROM, a CPU, a GPU, and a bus, and the RAM, the ROM, the CPU, the GPU, etc. may be connected to each other through buses.

Further, the controller 30 may include a managing unit 130, a registering unit 140, a receiver 110, an API server connection unit 120, a setting unit 150, an integrally-performing unit 170, a format conversion unit 160, and a security-processing unit 180, and at least one component included in the controller 30 may be included in another component included in the controller 30.

In this configuration, the gateway device 100 may be configured as a server.

Further, the communication unit 10 or the storage unit 20 may be included in the controller 30.

Further, at least one of a plurality of components constituting the controller 30 can transmit/receive various items of information to/from at least one of the client device and the plurality of API servers through the communication unit 10, and a communication configuration through the communication unit 10 is omitted in the following description.

First, the managing unit 130 can check a connection right of a client device that connects to the gateway device 100.

Further, the setting unit 150 can create and store a work interface for making (creating) a work scenario that can create a service execution result using a plurality of APIs related to an API service, which the user of the client device intends to provide to a customer (service user), on the basis of API use information including API list information and response format information for one or more APIs provided the plurality of API servers.

In this configuration, the work interface may be configured as a user interface, a graphic user interface, or the like.

Further, the managing unit 130 connects to the plurality of API servers through the API server connection unit 120, thereby being able to request a plurality of items of API use information respectively corresponding to the plurality of API servers from the plurality of API servers and to store the plurality of items of API use information received from the plurality of API servers.

In this case, the managing unit 130 may store the plurality of items of API use information in a specific API management DB included in the storage unit 20.

Accordingly, the setting unit 150 can check a connection right of a client device that has connected to the gateway device 100 in linkage with the managing unit 130, and when the client device is authenticated, the setting unit 150 can create and provide the work interface, which includes the plurality of items of API information, to the client device.

In this case, the setting unit 150 may create a work interface on the basis of a plurality of items of API use information stored in the API management DB and provide the work interface to the client device.

That is, the setting unit 150 can provide a work interface for setting a work scenario for an API service to the client device so that API-related work of a service configured to use a plurality of items of API call and response information can be set and used as a user-defined API service.

In this case, the client device can select a plurality of APIs required for a specific API service on the basis of the plurality of items of API use information included in the work interface, and can create setting information for performing combination of the plurality of selected APIs through the work interface and transmit the setting information to the gateway device 100.

For example, the client device can create an API execution type by designating at least one of one or more merged groups composed of a plurality of parallel execution APIs to be performed in parallel and one or more serial execution APIs to be sequentially performed in series through the work interface from the plurality of APIs selected to implement the specific API service, and then can create and transmit setting information including the plurality of selected APIs and the API execution type to the gateway device 100.

In this case, the API type may include the execution order of each of the plurality of selected APIs.

Meanwhile, when the registering unit 140 receives setting information from the client device in linkage with the setting unit 150, the registering unit 140 can store and register the setting information, as work scenario information for an API service (hereafter, work scenario information), in a work DB included in or configured separately from the storage unit 20.

In this case, the work scenario information may include service identification information (e.g., a service ID) corresponding to the specific API service, user identification information (or user information) corresponding to the client device, a request format designated by a user to correspond to a specific API service, and information about the plurality of APIs and the API execution types.

Further, the user identification information described in the present disclosure may include various items of information such as information for identifying a user, device identification information of the client device, and information for user authentication.

After the work scenario information is registered, as described above, the receiver 110 can receive request information for calling the specific API service or request information about a call of a specific API from the client device.

For example, the client device, in linkage with the gateway device 100, can provide a final execution result, which includes a service execution result for each of one or more API services included in the specific service according to execution of the specific service, to a service user terminal that has connected to an API-based specific service (specific front-end service) including the specific API service, and when the specific API service is called in the process of executing the specific service, the client device can create and transmit the request information to the gateway device 100.

Further, the receiver 110 can figure out whether the request information is a request for an API service call or a request for an API call by checking the request information.

In this case, when the request information is a request for an API call, the receiver 1110 can provide the request information to the API server connection unit 120.

Accordingly, when receiving the request information for an API call, the API server connection unit 120 can transmit the request information to a specific API server corresponding to the request information, and can receive response information corresponding to the request information from the specific API server and transmit the response information to the client device that transmitted the request information.

In this case, the request information for an API call may include the user identification information, a specific API that is a call object included in the specific service, search information including one or more search parameter values to be applied to the specific API, etc.

Further, when the request information is request information for a specific API service call as the result of checking the request information, the receiver 110 can recognize pre-registered work scenario information corresponding to the request information from the work DB in linkage with the registering unit 140.

In this case, the request information for an API service call may include service identification information corresponding to the specific API service, user identification information, search information including one or more search parameter values to be applied to at least one or more of a plurality of APIs included in the work scenario information to derive a service execution result through the specific API service, etc.

In this case, the search information may be query information.

Further, the receiver 110 can extract specific work scenario information corresponding to the request information from the work DB in linkage with the registering unit 140, and can provide the extracted work scenario information to the integrally-performing unit 170.

In this case, the receiver 110 may be included in the integrally-performing unit 170.

In the configuration described above, before the receiver 110 extracts work scenario information corresponding to the request information, the managing unit 130 can check a connection right of the client device that has connected to the gateway device 100, and when the connection right of the client device is authenticated in linkage with the managing unit 130, the receiver 110 can extract work scenario information corresponding to the request information such that the service execution result is created in the integrally-performing unit 170.

For example, user authentication information input by a user for user authentication corresponding to the user of the client device may be included in the request information, and the work scenario information can be matched and stored with user information corresponding to the work scenario information in the work DB.

In this case, when registering the work scenario information, the registering unit 140 can match the work scenario information received from the client device with pre-stored user information corresponding to the client device in the work DB and store the work scenario information in the work DB.

Accordingly, the management unit 130 compares the user authentication information included in the request information and the user authentication information included in the user information and authenticates the connection right of the user when the items of user authentication information are the same, and the receiver 110 can extract work scenario information, which corresponds to service identification information and user identification information included in the request information, from the work DB when the connection right of the user is authenticated.

As a detailed example of this configuration, the managing unit 130 may include a rule DB in which one or more items of rule information for checking a connection right of a user is stored. When receiving request information from the client device, the managing unit 130 can check a connection right of the client device by comparing user authentication information according to the request information and user authentication information included in the pre-stored user information corresponding to the client device with each other in accordance with at least one of a connection location of the client device, the user's right according to the user authentication information, and a connection path pattern on the basis of one or more items of preset rule information stored in the rule DB.

Meanwhile, when receiving specific work scenario information corresponding to a specific API service according to request information transmitted by the client device from the receiver 110, the integrally-performing unit 170 can connect to a plurality of API servers corresponding to the specific work scenario information in accordance with an API execution type according to the specific work scenario information, perform combination and execution of a plurality of APIs included in the specific work scenario information in parallel or in series in accordance with the API execution type set in advance in the specific work scenario information, and create a service execution result on the basis of response information received from each of a plurality of API servers respectively corresponding to the plurality of APIs in accordance with the execution.

Hereafter, the process of creating the service execution result on the basis of the work scenario information by means of the integrally-performing unit 170 is described in detail. The integrally-performing unit 170 can recognize APIs that are executed in parallel as parallel execution APIs and can recognize APIs that are executed in series as serial execution APIs in accordance with an API execution type set in the work scenario information for a plurality of APIs included in the work scenario information corresponding to the request information, and can recognize the execution order of each of the plurality of APIs.

Further, when the integrally-performing unit 170 recognizes a plurality of parallel execution APIs having the same execution order, the integrally-performing unit 170 requests and receives response information according to execution of the parallel execution APIs from API servers corresponding to the parallel execution APIs for the plurality of respective parallel execution APIs and then creates a response result that is new response information merging a plurality of items of response information corresponding to the plurality of parallel execution APIs, respectively; when the integrally-performing unit 170 recognizes the serial execution APIs, the integrally-performing unit 170 receives response information requested in accordance with execution of the serial execution APIs from API servers corresponding to the serial execution APIs; and the integrally-performing unit 170 applies response information corresponding to an earlier API as an input value to a later API corresponding to the next of the earlier API in accordance with the execution order of each of the plurality of APIs according to the API execution type. In this way, the integrally-performing unit 170 can create one service execution result described above on the basis of final response information obtained by executing the plurality of APIs in accordance with the API execution type.

Figure 4:
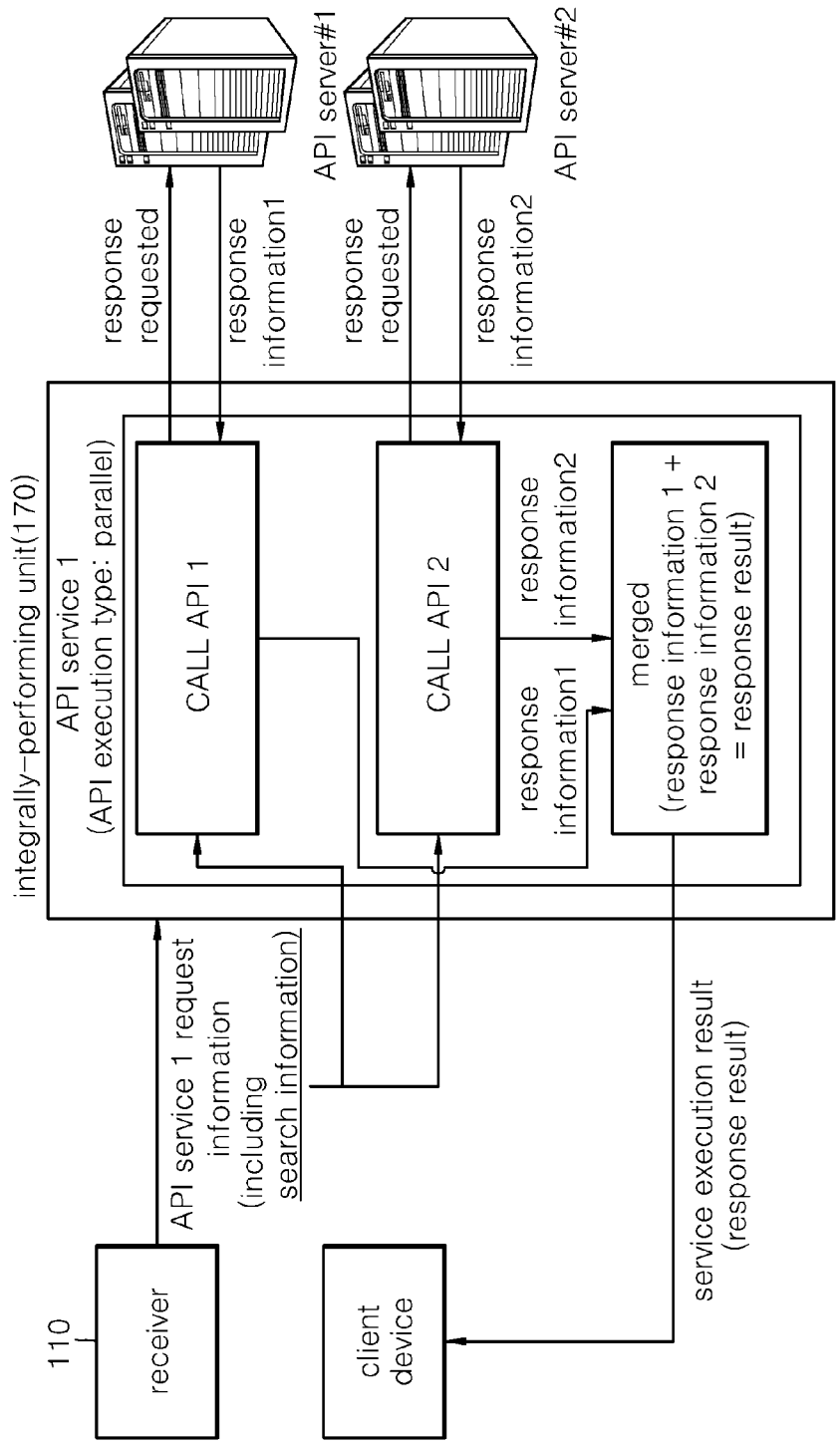

For example, as shown in FIG. 4, when an API execution type included in the work scenario information is a parallel execution type, the integrally-performing unit 170 can recognize a plurality of APIs having the same execution order included in the work scenario information as parallel execution APIs, can connect to an API server corresponding to the parallel execution APIs by executing the parallel execution APIs, to which search information according to the request information has been applied, for each of the plurality of parallel execution APIs, and then request response information corresponding to the parallel execution APIs to which the search information has been applied; and can receive response information corresponding to the parallel execution APIs, to which the search information has been applied from the API servers, from the connected API servers.

Accordingly, the integrally-performing unit 170 receives response information from each of a plurality of API servers respectively corresponding to the plurality of parallel execution APIs and merges the plurality of items of received response information, thereby being able to create a response result (or a merged response result or merged response information) that is new response information.

The integrally-performing unit 170 may further include a buffer unit. The integrally-performing unit 170 receives response information in an asynchronous type from each of a plurality of APIs corresponding to the plurality of parallel execution APIs, respectively, temporarily stores response information received earlier of a plurality of items of response information, which respectively corresponds to the plurality of execution APIs to which the search information has been applied, in the buffer unit, and merges response information received later than the response information stored in the buffer unit of the plurality of items of response information with the response information stored in the buffer unit, thereby being able to create a response result.

Further, the response result may be information including the plurality of items of received response information.

Further, the integrally-performing unit 170 can create a service execution result on the basis of the response result that is final response information.

Figure 5:
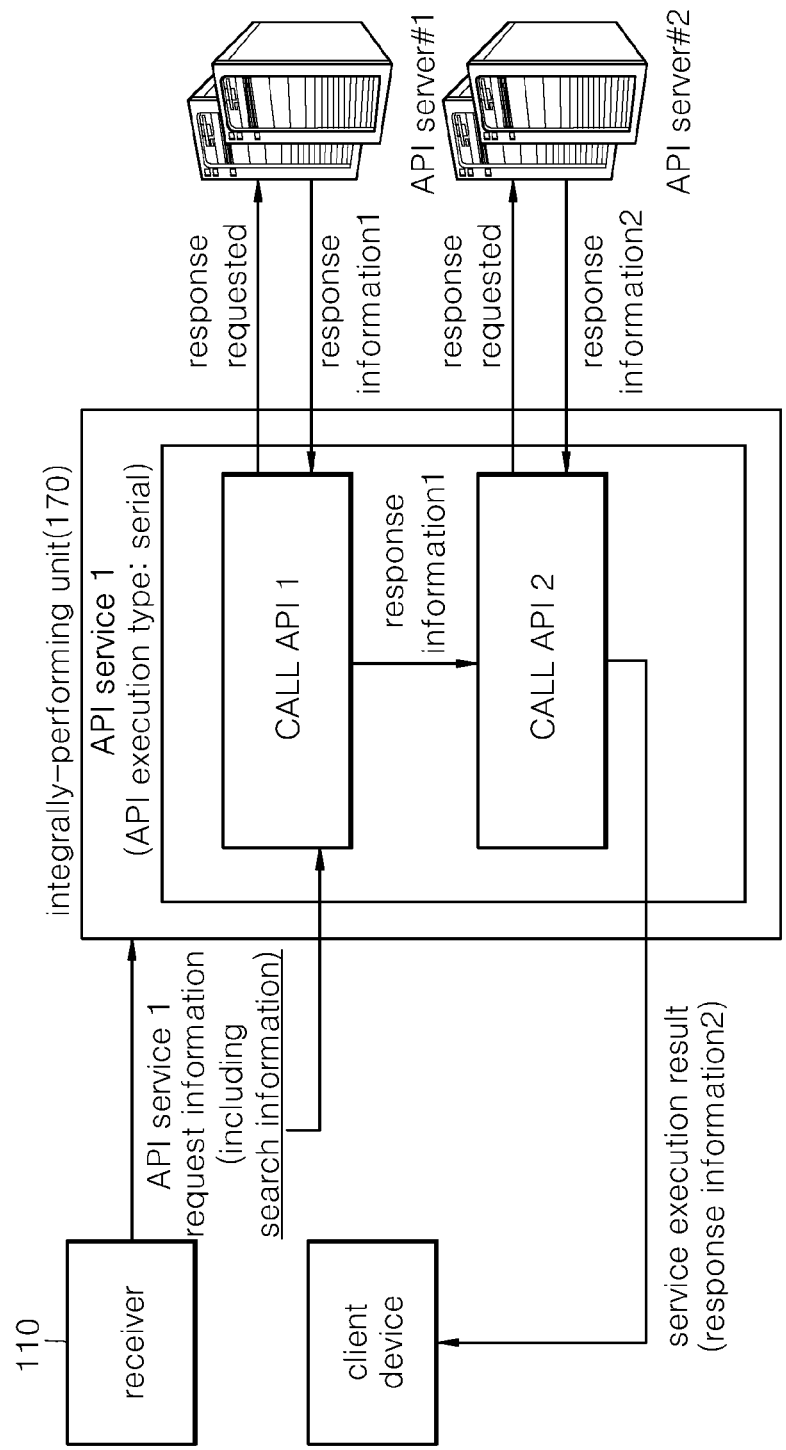

As another example, as shown in FIG. 5, when the API execution type included in the work scenario information is a serial execution type, the integrally-performing unit 170 can sequentially execute a plurality of APIs included in the work scenario information in accordance with the execution order for each API set in the API execution type.

That is, the integrally-performing unit 170 can apply the search information to a specific API that is executed first in the plurality of APIs, request response information corresponding to the specific API, to which the search information has been applied, from a specific API server corresponding to the specific API on the basis of the specific API to which the search information has been applied, and apply the response information as an input value to another API corresponding to the next of the specific API in accordance with the API execution type, and request response information corresponding to the another API, to which the input value has been applied, from another API server corresponding to the another API.

Further, when receiving response information from the another API server, the integrally-performing unit 170 can create a service execution result on the basis of the received response information that is final response information.

Figure 6:
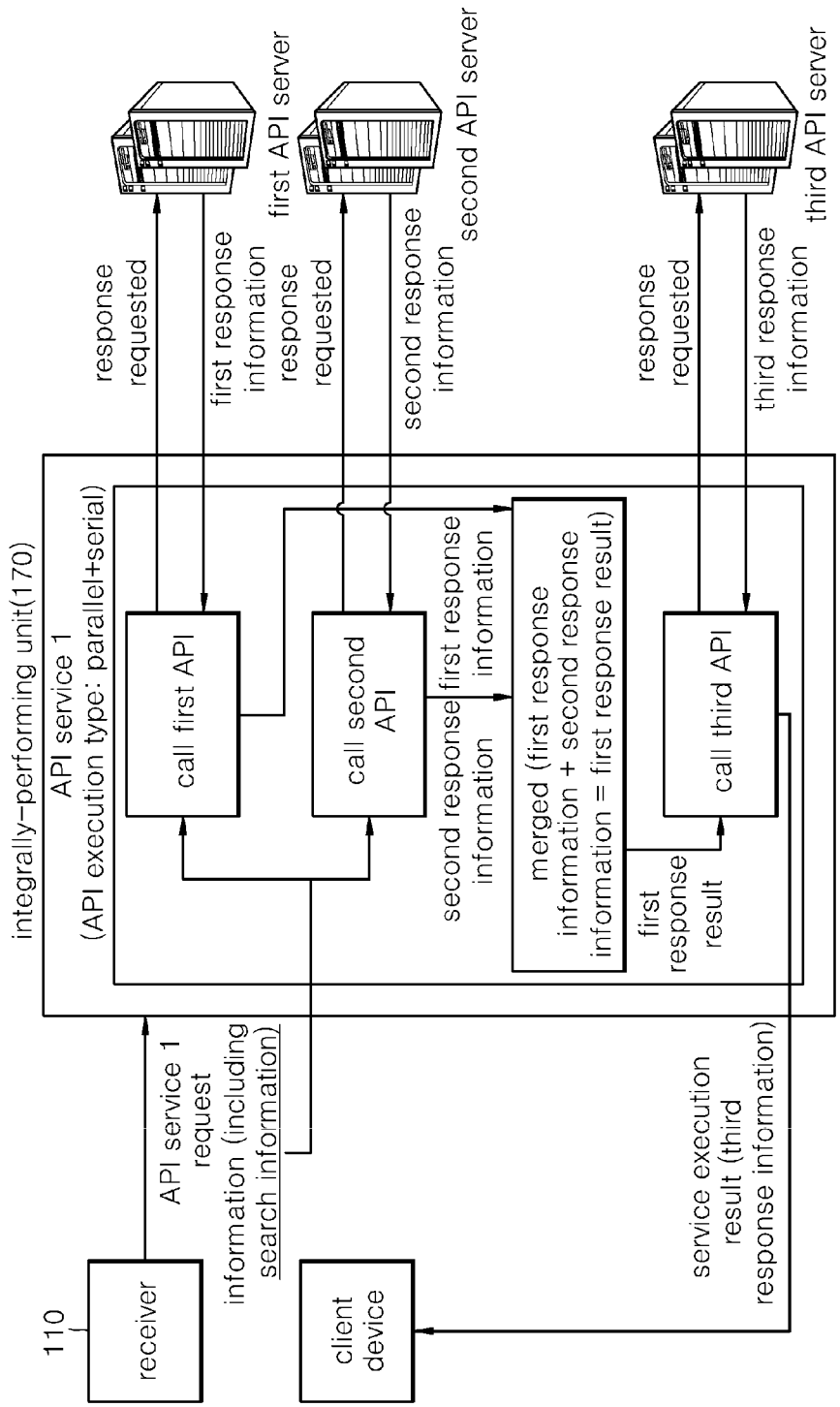

As another example, as shown in FIG. 6, when the API execution type is a first combination type in which parallel execution and serial execution are sequentially combined, the integrally-performing unit 170 can apply search information included in the request information to a first API and a second API that are serial execution objects having the same execution order in the plurality of APIs included in work scenario information, request and receive first response information corresponding to the first API, to which the search information has been applied, through communication with a first API server corresponding to the first API, request and receive second response information corresponding to the API, to which the search information has been applied, through communication with a second API server corresponding to the second API, and then create a first response result by merging the first response information and the second response information.

Thereafter, the integrally-performing unit 170 can apply the first response result obtained by merging the first and second response information, as an input value, to a third API that is a serial execution API recognized from the work scenario information in accordance with the first combination type, request and receive third response information corresponding to the third API, to which the first response result has been applied, through communication with a third API server corresponding to the third API, and then create a service execution result on the basis of the third response information that is final response information.

Figure 7:
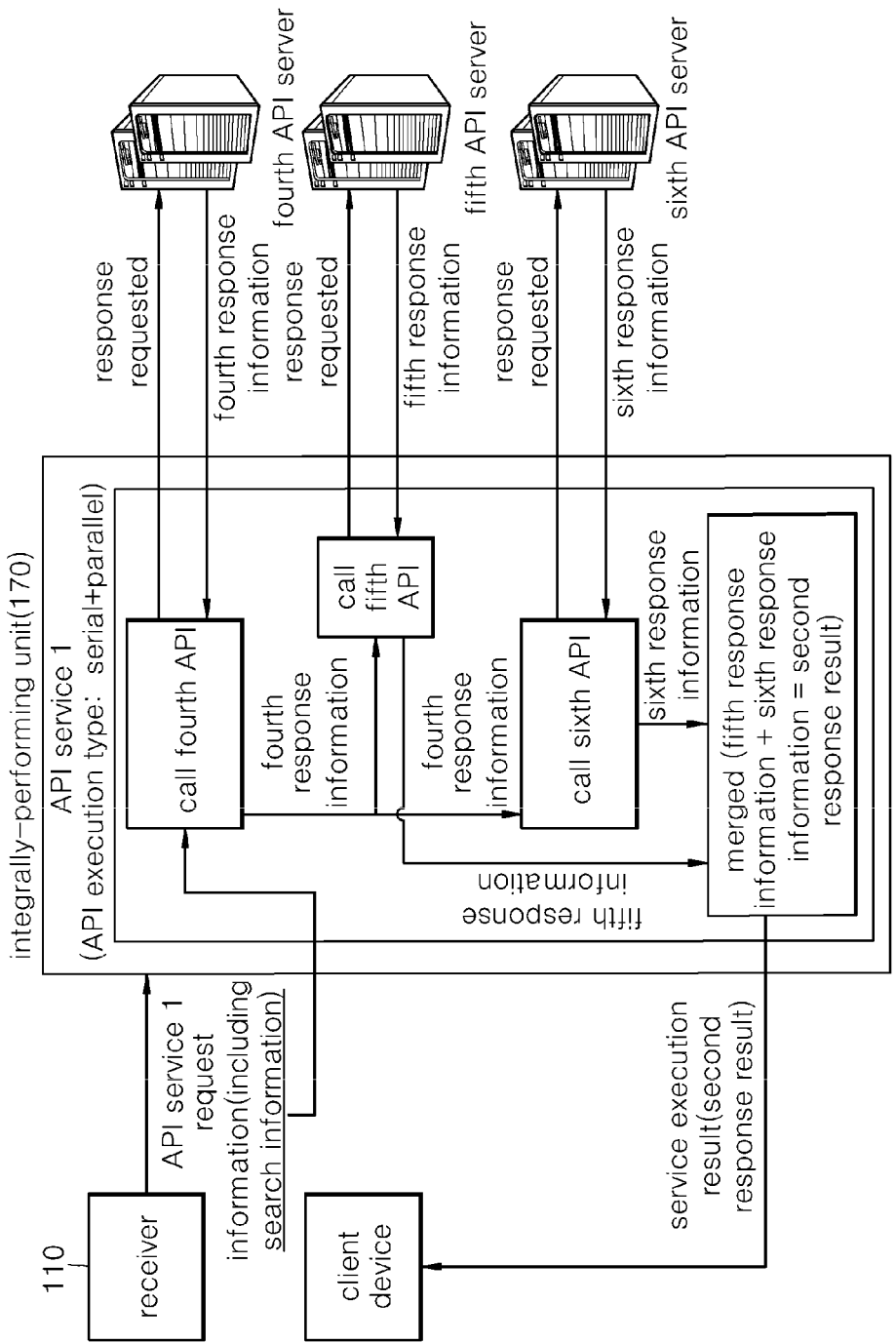

As another example, as shown in FIG. 7, when the API execution type is a second combination type in which serial execution and parallel execution are sequentially combined, the integrally-performing unit 170 can apply search information according to the request information to a fourth API that is a serial execution API of the plurality of APIs included in the work scenario information, request and receive fourth response information corresponding to a fourth API, to which the search information has been applied, through communication with a fourth API server corresponding to the fourth API, apply the fourth response information to a fifth API and a sixth API that are serial execution objects of which the execution orders recognized from the work scenario information are the same in accordance with the second combination type, request and receive fifth response information corresponding to a fifth API, to which the fourth response information has been applied, through communication with a fifth API server corresponding to the fifth API, request and receive sixth response information corresponding to a sixth API, to which the fourth response information has been applied, through communication with a sixth API server corresponding to the sixth API, and then create a second response result by merging the fifth response information and the sixth response information and create a service execution result on the basis of the second response result that is final response result.

Figure 8:
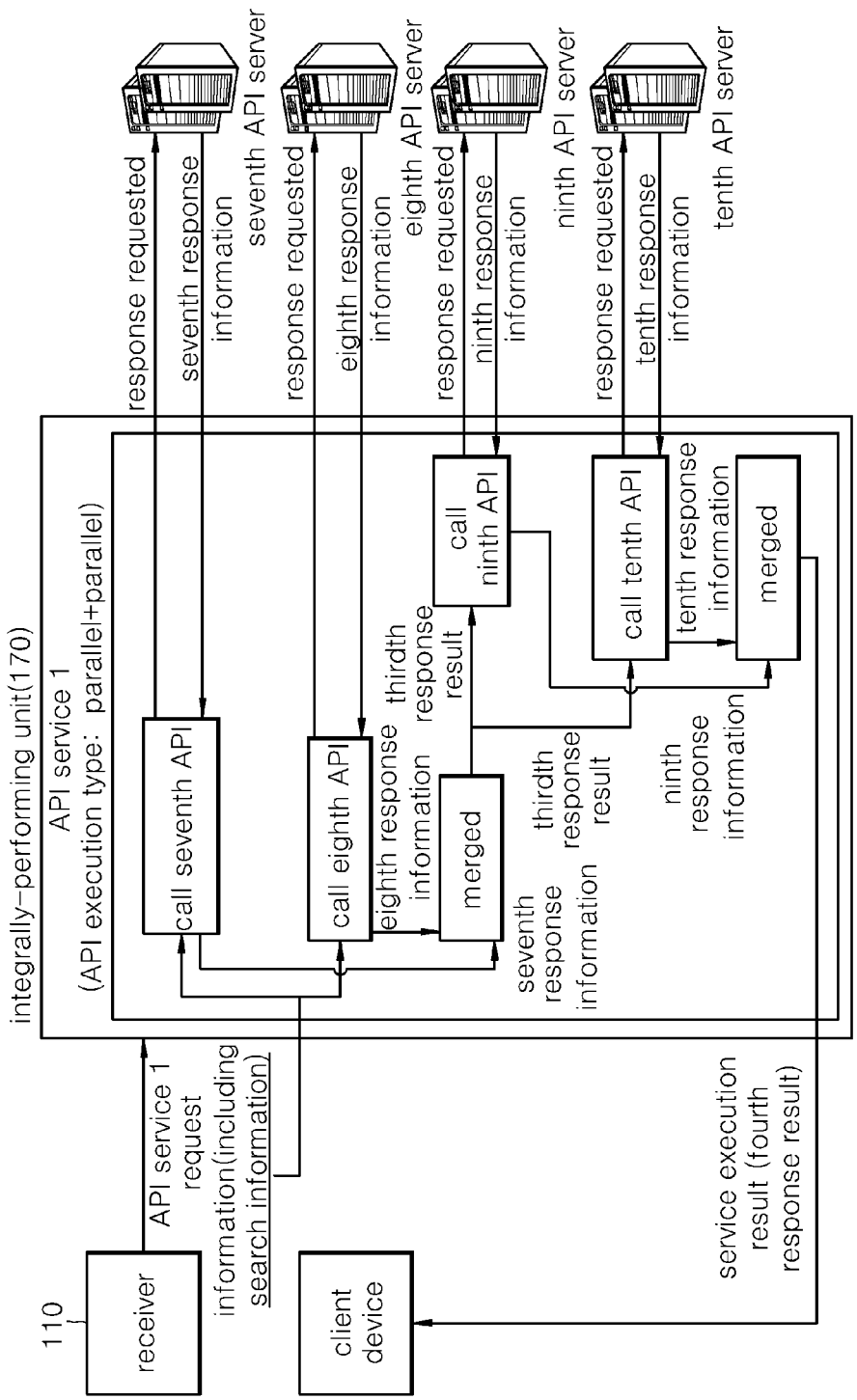

As another example, as shown in FIG. 8, when the API execution type is a third combination type in which a plurality of items of serial execution is combined, the integrally-performing unit 170 can apply search information included in the request information to a seventh API and an eighth API that are parallel execution objects in the plurality of APIs included in the work scenario information, request and receive seventh response information corresponding to a seventh API, to which the search information has been applied, through communication with a seventh API server corresponding to the seventh API, request and receive eighth response information corresponding to an eighth API, to which the search information has been applied, through communication with an eighth API server corresponding to the eighth API, create a third response result by merging the seventh response information and the eighth response information, apply the third response result to a ninth API and a tenth API that are serial execution objects of the plurality of APIs, request and receive ninth response information corresponding to a ninth API, to which the third response result has been applied, through communication with a ninth API server corresponding to the ninth API, request and receive tenth response information corresponding to a tenth API, to which the third response result has been applied, through communication with a tenth API server corresponding to the tenth API, and then create a fourth response result by merging the ninth response result and the tenth response result and create a service execution result on the basis of the fourth response result that is final response information.

In the configuration described above, the format conversion unit 160 can store response format information the format of response information for each of the plurality of API servers, and can perform operation of converting the format of the response information into a request format on the basis of response format information of an API server corresponding to the response information and the request format of the client device according to the work scenario information when (every time) it receives the response information in linkage with the integrally-performing unit 170.

In this case, the format conversion unit 160 may check response format information corresponding to the received response information in API use information of an API server corresponding to the received response information of a plurality of items of API use information stored in the API management DB.

Accordingly, when receiving the response information, the integrally-performing unit 170, in linkage with the format conversion unit 160, can check preset response format information for an API server corresponding to the response information and, on the basis of the response format information and a preset request format in the work scenario information, can convert the format of the received response information into the request format.

Further, the integrally-performing unit 170 can create the service execution result using the response information converted into the request format.

Figure 9:
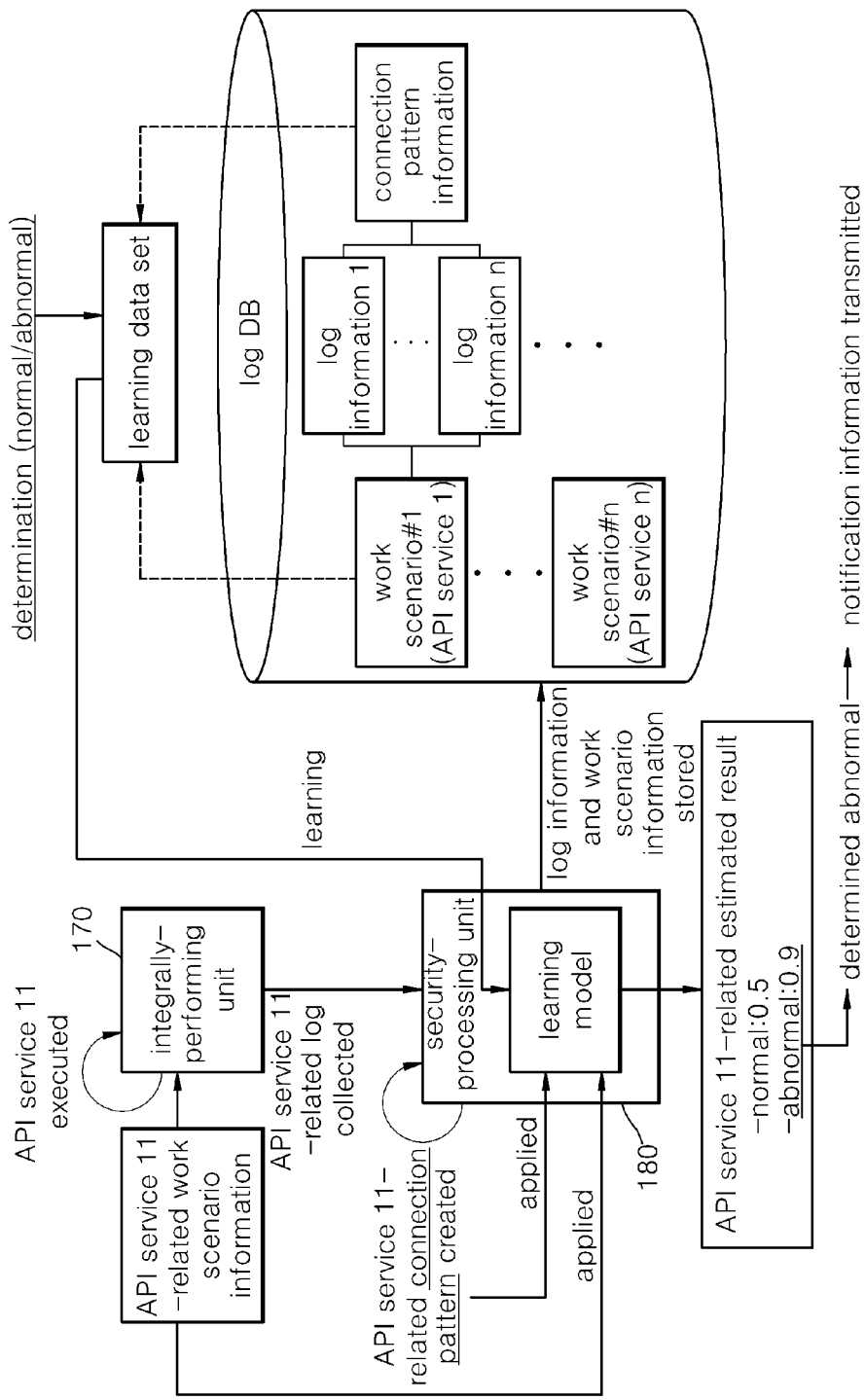

Meanwhile, as shown in FIG. 9, the security-processing unit 180, in linkage with the integrally-performing unit 170, creates log information about API server call and response for each of a plurality of APIs according to specific work scenario information and then creates connection pattern information on the basis of a plurality of items of log information corresponding to the specific work scenario information, and applies the created connection pattern information and the specific work scenario information to a preset learning model that has learned correlation between work scenario information, connection pattern information, and whether the connection pattern information is normal, thereby being able to determine whether there is a problem.

For example, every time the integrally-performing unit 170 calls an API server in accordance with execution of an API included in the specific work scenario information, the security-processing unit 180 can create log information corresponding to the called API server and create log information according to a response of the called API server, and can create log information, as described above, for each of a plurality of APIs included in the specific work scenario information.

Further, every time the log information is created, the security-processing unit 180 can match and store the log information with the specific work scenario information corresponding to the log information in a log DB included in or separately configured from the storage unit 20.

Further, the security-processing unit 180 can create connection pattern information on the basis of one or more items of log information matched and stored with work scenario information in the log DB and then can match and store the connection pattern information with work scenario information corresponding to the connection pattern information in the log DB.

Further, the security-processing unit 180 may include a deep learning-based learning model, and can create a learning data set on the basis of work scenario information and connection pattern information matched with each other in the log DB and can train the learning model to include the learning data set with a determination result of determining whether it is normal.

Accordingly, the security-processing unit 180 can make the learning model learn correlation between the connection pattern information, the work scenario information, and whether the connection pattern information is normal.

That is, the learning model can learn the result of determining whether a connection pattern according to a plurality of items of log information created when the integrally-performing unit 170 performs work in accordance with specific work scenario information is normal or abnormal.

In this case, the security-processing unit 180 can transmit determination result request information for requesting the result of determining whether work scenario information and connection pattern information included in the learning data set are normal to a preset manager terminal when creating the learning data set, and can put determination result information received from the manager terminal as a response for the determination result request information in the created learning data set and then make the learning model learn the determination result information.

Further, the learning model may be configured as a deep learning algorithm and the deep learning algorithm may be configured as one or more neural network modes.

Further, the neural network model (or neural network) described herein may be composed of an input layer, one or more hidden layers, and an output layer, and various kinds of neural networks such as a Deep Neural Network (DNN), a Recurrent Neural Network (RNN), a Convolutional Neural Network (CNN), and a Support Vector Machine (SVM) may be applied to the neural network mode.

Further, when the learning model finishes learning, every time an API service according to first work scenario information is performed, the security-processing unit 180, in linkage with the integrally-performing unit 170, can create and store a plurality of items of log information, which is matched with the first work scenario information in accordance with calls and responses of a plurality of API servers respectively corresponding to a plurality of APIs constituting the first work scenario information; and can create connection pattern information on the basis of a plurality of items of log information corresponding to the performed API service (the first work scenario information) and then can match and store the connection pattern information with first work scenario information of the performed API service in a log DB.

Further, every time the security-processing unit 180 creates connection pattern information, the security-processing unit 180 sets the created connection pattern information as current connection pattern information and then applies the current connection pattern information and the first work scenario information as input to the learning model, thereby being able to create estimated determination result information that is an estimated result of determining whether the current connection pattern information and the first work scenario information are normal.

For example, when receiving the current connection pattern information and the first work scenario information as input, the learning model can create estimated determination result information including a possibility of estimating that the current connection pattern information and the first work scenario information are normal and a possibility of estimating that the current connection pattern information and the first work scenario information are abnormal.

Further, when the estimation result (possibility) of estimating that the items of information are abnormal is a preset reference value or more on the basis of the estimated determination result information, the security-processing unit 180 can determine that access or execution of a function that is not related to execution of a specific API service according to the first work scenario information was performed in the integrally-performing unit 170, and can create notification information about generation of a problem.

That is, when abnormal access such as hacking is generated to information that is temporarily stored in the integrally-performing unit 170 in the process of executing a specific API service in accordance with first work scenario information in the integrally-performing unit 170, log information that is not created in the process of normally executing the specific API service is created, so current connection pattern information becomes different from normal connection pattern information corresponding to normal execution of the specific API service. Accordingly, the security-processing unit 180 can output an estimated determination result, in which the possibility of estimating that the current connection pattern information and the first work scenario information are abnormal is higher than the possibility of estimating that the items of information are normal, through the learning model, and can easily detect generation of a problem due to abnormal access or abnormal execution of a function through the learning model on the basis of the estimated determination result.

Further, when creating the notification information, the security-processing unit 180 can notify a manager of the danger of threatening security such as the danger of hacking by transmitting the notification information to a manager terminal of a preset manager.

In this case, the security-processing unit 180 can create and transmit notification information, which includes current connection pattern information and first work scenario information for which an estimated result of abnormality was output, to the manager terminal.

Meanwhile, every time the security-processing unit 180 creates the log information in linkage with the integrally-performing unit 170, the security-processing unit 180 can determine whether there is an error on the basis of the log information, and when an error is generated, the security-processing unit 180 can recognize a specific API server corresponding to an API having the error.

Further, the security-processing unit 180 can create error generation information including the log information with an error, can connect to the specific API server recognized on the basis of the log information with the error, and can transmit the error generation information to the specific API server.

Meanwhile, when creating a service execution result corresponding to the request information, the integrally-performing unit 170 can transmit the service execution result to the client device that transmitted the request information.

In this case, the service execution result may be configured as service execution result information and the integrally-performing unit 170 may transmit the service execution result to the client device through the receiver 110.

Accordingly, a client device receiving the service execution result, without a need for receiving response information by calling an API server for each of a plurality of APIs for an API service, can call a plurality of API servers in accordance with a work scenario set by the user of the client device from the gateway device 100 to create a service execution result corresponding to the API service only by calling the gateway device 100 and can receive the service execution result from the gateway device 100, and can provide the service execution result to a service user terminal that has connected to a specific service including the API service that is provided from the client device.

In this case, the client device can create and provide a final service execution result, which corresponds to the specific service including the service execution result, to the service user terminal.

Meanwhile, in the configuration described above, the integrally-performing unit 170 can provide not only the final response information, but response information or a response result temporarily stored in the buffer unit to the client device together with the service execution result.

As described above, the present disclosure provides a client device that provides a service using a plurality of APIs provided by a plurality of API servers and a gateway device that manages API call and response between the plurality of API servers; and gives support such that the user of the client device can create a work scenario by designating a plurality of APIs required for an API service and an execution type for the plurality of APIs in the gateway device and such that even though the client device requests a service execution result of the API service only one time, the gateway device can receive response information from the plurality of API servers while calling the plurality of APIs in accordance with the work scenario set by the user and then can provide a service execution result to the client device on the basis of the response information. Accordingly, it is possible to minimize traffic load that is generated between a client device and a gateway device in the related art and it is possible to increase service development efficiency for processing an API service. Further, a connection pattern is created on the basis of logs recorded every time an API service is executed in accordance with a work scenario and learned by a learning model together with the work scenario and the result of determining whether it is normal. Thereafter, when the learning model finishes learning, whether a current connection pattern for a specific API service that is currently executed and the specific API service are normal is determined through the learning model, and when it is determined that they are abnormal, it is determined that abnormal access such as hacking was generated to the gateway device, and security threatening is notified, whereby it is possible to increase security for information that is processed in the gateway device.

Further, the present disclosure increases convenience for updating an API-based service of a client device according to a change of an API server and improves an API service speed of a client device, thereby being able to greatly improve development and use efficiency of a service using APIs.

Further, it is apparent that various rule-based security management components based on the location of a user connected to a client device, the address of the connected user, login information, a management class, the content of a request message, the content of a response message, etc. can be further applied to the gateway device of the present disclosure.

Figure 10:
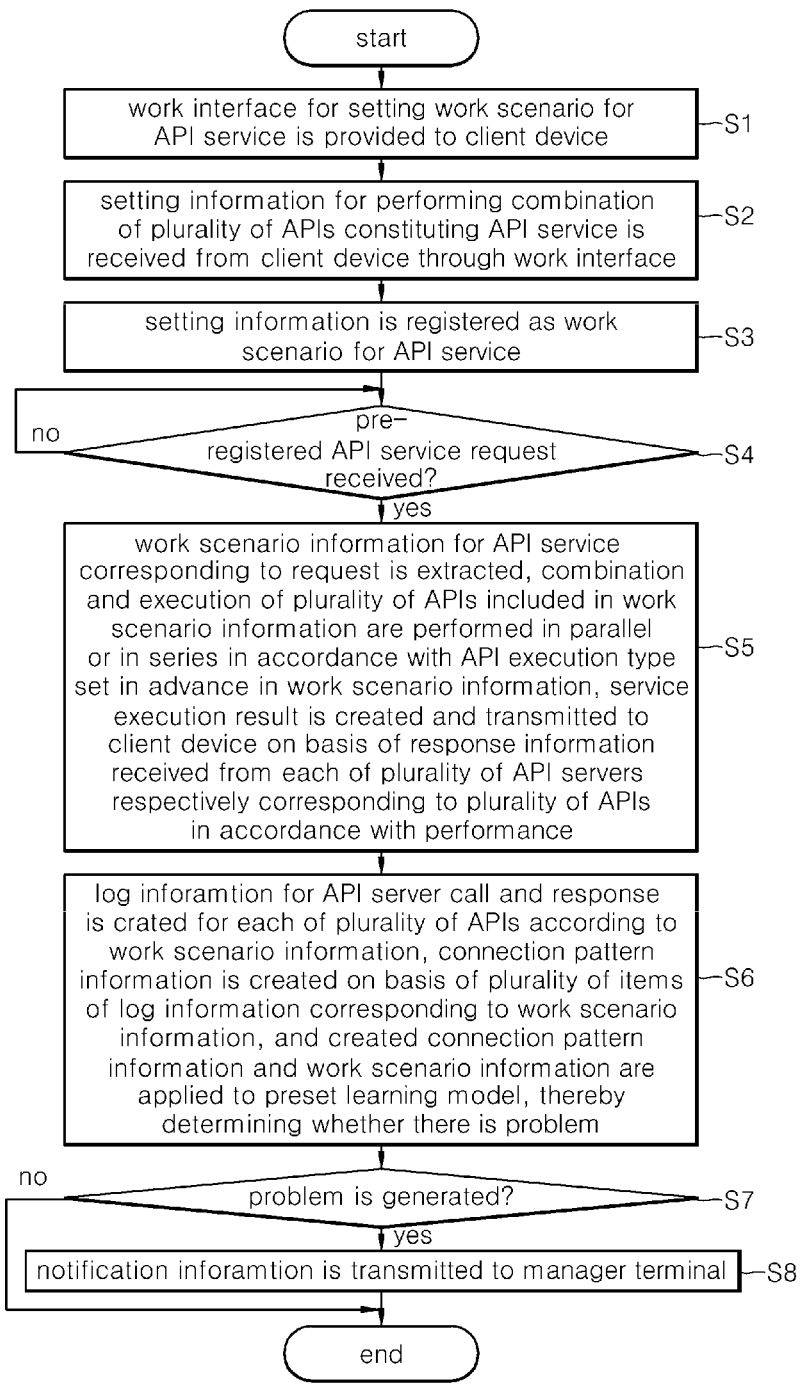
FIG. 10 is a flowchart of a method of operating the gateway device for integrally processing APIs with a security function according to an embodiment of the present disclosure.

FIG. 10 is a flowchart of a method of operating the gateway device 100 according to an embodiment of the present disclosure.

First, the gateway 100 integrally managing API calls and response information between a client device and a plurality of API server can provide a work interface for setting a work scenario for an API service to a client device so that API-related work of a service, which is configured to use a plurality of API calls and response information, is set and used as a user-defined API service (S1), and can receive setting information for performing combination of a plurality of APIs constituting the API service from the client device through the work interface (S2).

Further, the gateway device 100 can register the setting information as work scenario information for the API service (S3).

Further, when receiving request information for a pre-registered API service from the client device (S4), the gateway device 100 can extract the work scenario information corresponding to the request information, perform combination and execution of a plurality of APIs included in the work scenario information in parallel or in series in accordance with an API execution type set in advance in the work scenario information, create a service execution result on the basis of response information received from each of a plurality of API servers respectively corresponding to the plurality of APIs in accordance with the performance, and transmit the service execution result to the client device (S5).

Further, the gateway device 100 creates log information about API server call and response for each of a plurality of APIs according to the work scenario information, creates connection pattern information on the basis of a plurality of items of log information respectively corresponding to the plurality of APIs, and applies the created connection pattern information and the work scenario information to a preset learning model that has learned correlation between work scenario information, connection pattern information, and whether the connection pattern information is normal, thereby being able to determine whether there is a problem (S6). Further, when a problem is generated as the result of determining whether there is a problem (S7), the gateway device 100 can create and transmit notification information to a preset manager terminal (S8).

The components described in the embodiments of the present disclosure may be achieved by one or more common computers or computers for specific purposes, such as a storage, for example, a memory; hardware such as a processor, a controller, an ALU (arithmetic logic unit), a digital signal processor, a microcomputer, an FPGA (Field Programmable Gate Array), a PLU (programmable logic unit), and a microprocessor; and any devices that can execute software including a set of instructions and a combination thereof or instructions and can give responses.

The above description may be changed and modified by those skilled in the art without departing from the fundamental characteristics of the present disclosure. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the patent right of the present disclosure.

DESCRIPTION OF REFERENCE NUMERALS

100: Gateway device
10: Communication unit
20: Storage unit
30: Controller
110: Receiver
120: API server connection unit
130: Managing unit
140: Registering unit
150: Setting unit
160: Format conversion unit
170: Integrally-performing unit
180: Security-processing unit

What is claimed is:

1. A gateway device for integrally processing APIs with a security function that integrally manages API calls and response information between a client device and a plurality of API servers, the gateway device comprising:
a setting unit configured to provide a work interface for setting a work scenario for an API service so that API-related work of a service, which is configured to use a plurality of API calls and response information, is set and used as a user-defined API service, and receive setting information about performing combination of a plurality of APIs constituting the API service from the client device through the work interface;
a registering unit configured to register the setting information as work scenario information for the API service;
an integrally-performing unit configured to, when receiving request information for a pre-registered API service from the client device, in linkage with the registering unit, extract the work scenario information corresponding to the request information,
perform combination and execution of a plurality of APIs included in the work scenario information in parallel or in series in accordance with an API execution type set in advance in the work scenario information,
create a service execution result, based on response information received from each of a plurality of API servers respectively corresponding to the plurality of APIs in accordance with the performance, and
transmit the service execution result to the client device; and
a security-processing unit configured to, in linkage with the integrally-performing unit, create log information about API server call and response for each of a plurality of APIs according to the work scenario information and then create connection pattern information based on a plurality of items of log information corresponding to the work scenario information, and apply the created connection pattern information and the work scenario information to a preset learning model that has learned correlation between work scenario information, connection pattern information, and whether the connection pattern information is normal, thereby determining whether there is a problem,
wherein the security-processing unit determines that there is a problem when an estimated result of abnormality obtained by applying the created connection pattern information and the work scenario information to the learning model is a preset reference value or more, creates and transmits notification information to a preset terminal when there is a problem, and
wherein the registering unit matches and stores the work scenario information received from the client device with pre-stored user information corresponding to the client device when registering the work scenario information; the gateway device further includes a managing unit configured to check a connection right of the client device, when receiving request information from the client device, by comparing user authentication information according to the request information and user authentication information included in the pre-stored user information corresponding to the client device with each other in accordance with at least one of a connection location of the client device, a user right according to user authentication information, and a connection path pattern, based on preset rule information; and the integrally-performing unit creates the service execution result when the client device is authenticated in linkage with the managing unit.

2. The gateway device of claim 1, wherein the security-processing unit determines whether there is an error based on the log information every time the security-processing unit creates the log information, and, when an error is generated, the security-processing unit creates error generation information including the log information having an error and transmits the error generation information to a specific API server corresponding to an API having the error.

3. The gateway device of claim 1, further comprising a format conversion unit configured to store response format information for a format of the response information of each of the plurality of API servers, and
convert the format of the response information into request information of the client device based on response format information of an API server corresponding to the response information and the request format of the client device according to the work scenario information when receiving the response information in linkage with the integrally-performing unit, wherein the integrally-performing unit creates the service execution result using a plurality of items of response information converted into the request format.

4. The gateway device of claim 1, wherein the integrally-performing unit recognizes APIs that are executed in parallel in accordance with the API execution type set in the work scenario information for each of a plurality of APIs included in the work scenario information as parallel execution APIs, recognizes APIs that are executed in series as serial execution APIs, recognizes an execution order of each of the plurality of APIs, requests and receives, when determining a plurality of parallel execution APIs having the same execution order, response information according to execution of the parallel execution APIs from API servers corresponding to the parallel execution APIs for the plurality of respective parallel execution APIs and then create a response result that is response information merging a plurality of items of response information corresponding to the plurality of parallel execution APIs, respectively, receives, when determining the serial execution APIs, response information requested in accordance with execution of the serial execution APIs from API servers corresponding to the serial execution APIs, and applies response information corresponding to an earlier API as an input value to a later API corresponding to a next of the earlier API in accordance with the execution order of each of the plurality of APIs according to the API execution type, thereby creating a service execution result based on final response information obtained by executing the plurality of APIs.

5. The gateway device of claim 4, wherein when the API execution type is a first combination type in which parallel execution and serial execution are sequentially combined, the integrally-performing unit:

applies search information included in the request information to a first API and a second API that are serial execution objects having the same execution order in the plurality of APIs, and requests and receives first response information corresponding to the first API, to which the search information has been applied, through communication with a first API server corresponding to the first API;

requests and receives second response information corresponding to the second API, to which the search information has been applied, through communication with a second API server corresponding to the second API; and then creates a first response result by merging the first response information and the second response information; and applies the first response result, as an input value, to a third API that is a serial execution API recognized in accordance with the first combination type, and requests and receives third response information corresponding to the third API, to which the first response result has been applied, through communication with a third API server corresponding to the third API; and then creates a service execution result based on the third response information.

6. The gateway device of claim 4, wherein when the API execution type is a second combination type in which serial execution and parallel execution are sequentially combined, the integrally-performing unit:

applies search information according to the request information to a fourth API that is a serial execution API of the plurality of APIs, and requests and receives fourth response information corresponding to a fourth API, to which the search information has been applied, through communication with a fourth API server corresponding to the fourth API;

applies the fourth response information to a fifth API and a sixth API that are serial execution objects recognized in accordance with the second combination type of the plurality of APIs, requests and receives fifth response information corresponding to a fifth API, to which the fourth response information has been applied, through communication with a fifth API server corresponding to the fifth API, and requests and receives sixth response information corresponding to a sixth API, to which the fourth response information has been applied, through communication with a sixth API server corresponding to the sixth API; and then creates a second response result by merging the fifth response information and the sixth response information and creates a service execution result based on the second response result.

7. The gateway device of claim 4, wherein when the API execution type is a third combination type in which a plurality of items of serial execution is combined, the integrally-performing unit:

applies search information included in the request information to a seventh API and an eighth API that are parallel execution objects in the plurality of APIs, requests and receives seventh response information corresponding to a seventh API, to which the search information has been applied, through communication with a seventh API server corresponding to the seventh API, and requests and receives eighth response information corresponding to an eighth API, to which the search information has been applied, through communication with an eighth API server corresponding to the eighth API; and then creates a third response result by merging the seventh response information and the eighth response information; and applies the third response result to a ninth API and a tenth API that are serial execution objects of the plurality of APIs, requests and receives ninth response information corresponding to a ninth API, to which the third response result has been applied, through communication with a ninth API server corresponding to the ninth API, and requests and receives tenth response information corresponding to a tenth API, to which the third response result has been applied, through communication with a tenth API server corresponding to the tenth API; and then creates a fourth response result by merging the ninth response result and the tenth response result and creates a service execution result based on the fourth response result.

8. A method of operating a gateway device for integrally processing APIs with a security function that integrally manages API calls and response information between a client device and a plurality of API servers, the method comprising:
- providing a work interface for setting a work scenario for an API service so that API-related work of a service, which is configured to use a plurality of API calls and response information, is set and used as a user-defined API service, and receiving setting information about performing combination of a plurality of APIs constituting the API service from the client device through the work interface;
- registering the setting information as work scenario information for the API service;
- extracting, when receiving request information for a pre-registered API service from the client device, the work scenario information corresponding to the request information, performing combination and execution of a plurality of APIs included in the work scenario information in parallel or in series in accordance with an API execution type set in advance in the work scenario information, creating a service execution result, based on response information received from each of a plurality of API servers respectively corresponding to the plurality of APIs in accordance with the performance, and transmitting the service execution result to the client device; and
- creating log information about API server call and response for each of a plurality of APIs according to the work scenario information and then creating connection pattern information based on a plurality of items of log information corresponding to the work scenario information, and applying the created connection pattern information and the work scenario information to a preset learning model that has learned correlation between work scenario information, connection pattern information, and whether the connection pattern information is normal, thereby determining whether there is a problem, and
- the method further comprises determining that there is a problem when an estimated result of abnormality obtained by applying the created connection pattern information and the work scenario information to the learning model is a preset reference value or more, and creating and transmitting notification information to a preset terminal when there is a problem,
- matching and storing the work scenario information received from the client device with pre-stored user information corresponding to the client device when registering the work scenario information;
- checking a connection right of the client device, when receiving request information from the client device, by comparing user authentication information according to the request information and user authentication information included in the pre-stored user information corresponding to the client device with each other in accordance with at least one of a connection location of the client device, a user right according to user authentication information, and a connection path pattern, based on preset rule information; and
- creating the service execution result when the client device is authenticated.

\* \* \* \* \*